United States Patent Office 2,895,941
Patented July 21, 1959

2,895,941

STABILIZED VINYL RESINS CONTAINING CHLORINE

Charles W. Montgomery and Robert C. Bryan, Jr., Baton Rouge, La., assignors to Ethyl Corporation, New York, N.Y., a corporation of Delaware No Drawing. Application October 10, 1956
Serial No. 615,006

5 Claims. (Cl. 260—45.75)

This invention relates to stabilized chlorine-containing vinyl resins and more particularly, but not exclusively, to thermally stabilized compositions of vinyl chloride resins, such as polyvinyl chloride.

It is well known that chlorine-containing vinyl resins, including polyvinyl chloride and interpolymers of vinyl chloride, are liable to discoloration when subected to elevated temperatures during or after compounding or processing. A number of stabilizers have been proposed for preventing or retarding such discoloration. Some of the more common stabilizers which have been previously suggested are calcium stearate, cadmium laurate, barium ricinoleate and other metal salts of organic acids, dibenzene sulfonamide, strontium naphthenate, the alkali metal phosphates, basic lead maleates and phthalates, etc. Various tin compounds have also been used as stabilizers, for example, dibutyl tin basic acetate, dibutyl tin diacetate, dibutyl tin dilaurate, tributyl tin stearate, diphenyl tin oleate and organo tin mercaptides. In the concentrations necessary to adequately stabilize chlorine-containing vinyl resins, many of the above stabilizers are incompatible with such resins, and when employing the usual processing temperatures of 300–350° F., much of the stabilizer volatilizes and is lost. Moreover, the manufacturing cost of these stabilizers is so high that the stabilizer cost usually constitutes an abnormal proportion, up to 20 percent, of the total cost of the finished resin.

It is an object of this invention to provide an improved thermally stabilized chlorine-containing vinyl resin composition. Another object of this invention is to provide an improved thermal stabilizer composition and a chlorine-containing vinyl resin composition containing the same. Another object is to provide a composition of the above type containing a stabilizer which is effective in very low concentrations and which is essentially non-volatile and compatible with the above vinyl resins. Still another object is to provide a composition of the above type using a relatively low cost stabilizer or stabilizers. Other objects and advantages of the invention will be more apparent from the following description and appended claims.

It has now been found that chlorine-containing vinyl resins can be made resistant to the discoloring effects of heat by the addition to the resin of a stabilizing amount, generally between about 0.001 to 1.0 percent of an azoaromatic compound.

Because the stabilizers of this invention are so effective at low concentration they have a decided economic advantage over known stabilizer compositions, either when used alone or in combination with other known stabilizers. Also, in such concentrations, they are compatible with the resin and are essentially non-volatile at normal processing temperatures.

An azo-aromatic compound in accordance with this invention is meant a compound having the formula ArN=NAr′ in which Ar and Ar′ are the same or different aromatic radicals. The aromatic radicals can be mono- or polynuclear, e.g., phenyl, naphthyl, anthracyl, phenanthryl and the higher fused ring compounds, generally up to about pentacyl, that is those having up to about 15 carbon atoms in the nucleus. The aromatic radicals can be mono- or poly-substituted with either organic or inorganic substituents which do not react with either the polymer or with additives such as plasticizers, and the like. The organic substituents can be either aliphatic or aromatic or both. Typical aliphatic substituents are methyl, ethyl, propyl, isopropyl, butyl, octyl, tetradecyl and others up to about 20 carbon atoms. Also, alkoxy, alkylmercapto, alkylamino, and other alkyl-substituted functional groups can be substituents on the aromatic radical. Cycloaliphatic radical substituents or derivatives such as cyclohexyl, cyclohexanyl and the like are also suitable. The aromatic radical can also have aryl or aralkyl substituents such as phenyl, tolyl, sylyl, alkyl phenyl, e.g., methyl phenyl, ethyl phenyl, isopropyl phenyl or the like.

In addition to hydrocarbon azo-aromatic compounds, the hydrocarbon radical can be substituted with hydroxy, carboxy, and esters thereof, amino, mercapto, nitro, halo, cyano, and similar radicals and mixtures of one or more of said substituents. Amino substituted azo-aromatic compounds are particularly effective, the amino group apparently increasing the stabilizing power of the azoaromatic compound.

Typical specific examples of azo-aromatic compounds suitable for use in this invention are azobenzene, azonaphthalene, e.g., 1,1′-azonaphthalene, azoanthracene, e.g., 1,2′-azoanthracene, azophenanthrene, e.g., 2,3′-azophenanthrene, naphthalene azobenzenes, e.g., 1-naphthalene azobenzene, anthracene azobenzene, e.g., 1- or 2-anthracene azobenzene, 4-biphenyl azobenzene, 2,3-dimethyl azobenzene, 2,2′-dimethyl azobenzene, 2-propyl azobenzene, 2-octyl azobenzene, 2-tetradecyl azobenzene, 2,2′-dimethoxy azobenzene, 2-methyl 2′-ethoxy azobenzene, 2-methylmercapto azobenzene, 3-octylmercapto azobenzene, 2-methylamino azobenzene, 2-amino azobenzene, 2,2′-diamino azobenzene, 4,4′-diamino azobenzene, 1,1′-diamino-2,2′-azonaphthalene, 4,4′-azodiphenol, 2-chloro azobenzene, 2,2′-dibromo azobenzene, 3-nitro azobenzene, 2-naphthalene azo-4-nitrobenzene, benzene azobetanaphthyl, 3-mercapto azobenzene, 4-4′-dimercapto azobenzene, diansidine bisazo dimethylaniline, 4-amino-2-naphthalene azobenzene, 2,4-disazo-bis-metatoluene-diamine, and 5-chloro-2-anisole azobetanaphthol.

The above compounds are particularly effective with chlorine-containing vinyl resins, including polyvinyl chloride, polyvinylidene chloride and chlorine and fluorine-containing polymers, such as polymers of dichloro-difluoroethylene. In addition, copolymers of chlorine-containing monomers are also stabilized by the azo-aromatic stabilizers of this invention. Typical examples of these copolymers are vinyl chloride-vinylidene chloride, vinyl chloride-dichloro-difluoroethylene, and interpolymers of various chloro-fluoroethylenes. The azo-aromatic stabilizers are also effective with copolymers of chlorine-containing vinyl monomers with other unsaturated compounds, typical examples being the vinyl esters of carboxylic acids, e.g., vinyl acetate, vinyl propionate, vinyl butyrate, vinyl benzoate, esters of unsaturated acids, e.g., methyl acrylate, ethyl acrylate, butyl acrylate, allyl acrylate and the corresponding esters of methacrylic acid; vinyl aromatic compounds, for example, styrene, ortho-chlorostyrene, p-chlorostyrene, p-ethyl styrene divinyl benzene, vinyl naphthalene, alpha-methyl styrene; dienes such as butadiene and chloroprene; amides, such as acrylic acid amide, acrylic acid anilide; nitriles, such as acrylic acid nitrile; esters of alpha, beta-unsaturated carboxylic acids, e.g., the methyl, ethyl, propyl, butyl, amyl, hexyl, heptyl, octyl, allyl, methallyl and phenyl esters of maleic, crotonic, itaconic and fumaric acids.

The azo-aromatic compounds of this invention appreciably increase the stabilizing power of certain conventional tin stabilizer systems, and in some cases the resultant stability is even greater than the sum of the stabilization obtained when using the stabilizers separately. The tin stabilizers which are particularly effective in combination with azo-aromatic compounds are tin mercaptides and organo tin salts of organic acids.

The organo tin salts of organic acids have the general formula $$R_xSn(COOR')_{4-x}$$

in which R and R' are the same or different and are selected from the group consisting of alkyl, aryl, aralkyl, alkaryl or cycloalkyl groups and $x$ is an integer from 1–3, inclusive, preferably 2. R and R' generally have from 1–30 carbon atoms. R preferably is alkyl and preferably has 2–8 carbon atoms, whereas R' is also preferably alkyl and preferably has 10–20 carbon atoms.

Typical examples of suitable organo tin salts are methyl tin trilaurate, diethyl tin dimyristate, dibutyl tin di-(pentadecanoate), dibutyl tin dilaurate, diheptyl tin dilaurate, dihexyl tin dilaurate, dihexyl tin dipalmitate, dibutyl tin distearate, dihexyl tin distearate, dioctyl tin dimontonoate, tributyl tin laurate, phenyl tin trilaurate, diphenyl tin distearate, ditolyl tin dilaurate, dibutyl tin dibenzoate, dibutyl tin di(cyclohexyl benzoate), dibutyl tin di(cyclohexane carboxylate) and the like. These are known compounds and can be prepared by conventional methods already disclosed in the art.

The tin mercaptides useful in this invention have the general formula $$(RS)_4Sn$$

wherein R is an alkyl, aryl, aralkyl, alkaryl, alkenyl, aralkenyl, or cycloalkyl group.

Typical examples of suitable tin mercaptides are methyl tin mercaptide, butyl tin mercaptide, hexyl tin mercaptide, octyl tin mercaptide, cetyl tin mercaptide, lauroyl tin mercaptide, phenyl tin mercaptide, paramethyl phenyl tin mercaptide, abietyl tin mercaptide, biphenylyl tin mercaptide, bornyl tin mercaptide, camphanyl tin mercaptide, cinnamyl tin mercaptide, cresyl tin mercaptide, crotyl tin mercaptide, cyclohexyl tin mercaptide, fenchyl tin mercaptide, furfuryl tin mercaptide, geranyl tin mercaptide, naphthyl tin mercaptide, piperazinyl tin mercaptide, and piperidyl tin mercaptide. The above tin mercaptides can be produced by reacting an organic mercaptan of the general formula RSH with a stannic halide, e.g., stannic chloride.

The following examples are illustrative of the invention but are not to be construed as in any way limiting the same.

EXAMPLES I–VI

Table I below shows the results of tests conducted with a series of polyvinyl chloride samples stabilized with various azo-aromatic compounds. In each of the examples the polyvinyl chloride (100 parts) was first thoroughly blended with 50 parts of dioctyl phthalate. The stabilizing agents were thereafter blended into the plasticized polyvinyl chloride samples on a roll mill heated to 300° F. The samples were thoroughly mixed for five-minute periods and then rolled into sheets having a thickness of 0.020 inch. These sheets were press polished and thereafter cut into one inch squares. Eight squares of each sample were placed on a glass plate and heated in a forced draft oven at 350° F. One square of each sample was removed from the oven at 15 minute intervals. Upon removal, each square was attached to a card and identified by time of treatment. The times for the initial and the dark brown color are given in Table I, below. The concentration of azo-aromatic compound in each of these examples was 0.05, based on the weight of the polyvinyl chloride.

*Table I*

| Example No. | Azo-aromatic compound | 1st color (min.) | Dark brown color (min.) |
|---|---|---|---|
| I | Azobenzene | 30 | 105 |
| II | p-Amino azobenzene | 30 | 90 |
| III | Dimethyl amino azobenzene | 30 | 60 |
| IV | Amino azotoluene | 30 | 90 |
| V | 1-naphthylamine-4-azobenzene | 15 | 60 |
| VI | None | | <5 |

When the Example I is repeated employing dianisidine bisazo dimethylaniline, meta diamino azobenzene, benzene azo beta-naphthylamine, toluene 2-4-disazo-bis-meta-toluenediamine, benzene azo beta-naphthol, or 5-chloro-1-2-anisole azo beta-naphthol, similar results are obtained. Also, when the above examples are repeated using stabilizer concentrations of 0.001, 0.002, 0.01 and 0.10, similar results are obtained. Similar results are obtained when the other azo-aromatic compounds listed in the "Colour Index," edited by F. M. Rowe, and published by the Society of Dyers and Colourists (1924) are used in the above examples. This publication also gives methods of manufacture for all of the azo-aromatic compounds shown by way of example herein.

EXAMPLE VII

Example III was repeated using a vinyl chloride-vinyl acetate copolymer (87% vinyl chloride). The first appearance of color was after 15 minutes and the resin did not become dark until after 30 minutes. A similar unstabilized copolymer became black in less than one minute.

EXAMPLE VIII

Example III was repeated using a vinyl chloride-dichloro-difluoroethylene copolymer (80–20) and this resin did not darken until about 30 minutes. This is in contrast to a similar unstabilized copolymer which darkens immediately under similar conditions. The homopolymer of dichlorodifluoro ethylene, when stabilized in accordance with Example III, also has considerably greater thermal stability.

Other chlorine-containing vinyl resins can also be thermally stabilized by the azo-aromatic compounds of this invention. Thus, similar results are obtained with vinyl chloride or vinylidene chloride copolymers with vinyl butyrate, vinyl benzoate, butyl acrylate, styrene and acrylonitrile.

The following examples illustrate the exceptional stabilizing action of the azo-aromatic compounds with organo tin mercaptide and organo tin salts of carboxylic acids. It should be noted that in all cases the combined stabilizers are surprisingly better than either stabilizer used separately and in certain cases (see Example XII for example) the combined stabilizers provides resin stability greater than the sum of the stabilization of the separate stabilizers, i.e. they are synergistic. It would not be expected that the addition of another stabilizer would materially improve the stability of the resin, particularly since the tin compounds are employed in optimum concentrations in the following examples.

It is usually desirable to premix the azo-aromatic compound with the tin compound prior to adding the same to the resin. When the stabilizers are premixed, the stabilizer can be more thoroughly and completely dispersed in the resin and optimum co-action between the two stabilizing components is assured.

EXAMPLE IX

Samples were prepared and tested as discussed in the above examples, using an azo-aromatic compound and tin stabilizer which were premixed before adding the same to the resin. The azo-aromatic compound was again employed in a concentration of only 0.05 percent, based on the weight of polyvinyl chloride. The tin compound and azo-aromatic compound were blended into the resin on a roll mill. The tin compound was used in a concentration of 3 percent in Examples IX–XIV inclusive and in a concentration of 1 percent in Examples XV and XVI. The results are given in Table II.

Table II

| Ex. No. | Azo-aromatic compound | Tin Compound | 1st color (min.) | Dark brown color (min.) |
|---|---|---|---|---|
| IX | None | DBTDL [1] | 30 | 75 |
| X | Azobenzene | DBTDL [1] | 60 | 105 |
| XI | p-Amino azobenzene | DBTDL [1] | 90 | 105 |
| XII | Dimethyl amino azobenzene | DBTDL [1] | 135 | >165 |
| XIII | Amino azotoluene | DBTDL [1] | 90 | >105 |
| XIV | 1-naphthylamine-4-azobenzene | DBTDL [1] | 90 | 105 |
| XV | None | T-31 [2] | 90 | 105 |
| XVI | Dimethyl amino azobenzene | T-31 [2] | 105 | 150 |

[1] Dibutyl tin dilaurate.
[2] An organotin mercaptide marketed commercially by Metal and Thermit Corporation.

The above results are completely unexpected since no appreciable stability improvement would be expected by the addition of this very minor quantity (0.05 percent) of azo-aromatic compounds to the above tin compounds. Whereas the total stabilizer concentration is only increased by slightly over 1 percent, a major change in the stability of the resin is obtained in all instances. For example, in Example XII, the time before which any decomposition begins is increased about 350 percent and the time before a dark brown color appears is increased about 120 percent.

EXAMPLE XVII

The above Examples X–XIV inclusive are repeated using methyl tin trilaurate in place of the dibutyl tin dilaurate with similar results.

EXAMPLE XVIII

Examples X–XIV are repeated using 2 percent diphenyl tin distearate instead of the dibutyl tin dilaurate. Similar results are obtained.

EXAMPLE XIX

Examples X–XIV are repeated using as the tin stabilizer 6 percent of dibutyl tin dibenzoate with similar resin stabilizing results.

EXAMPLE XX

Examples X–XIV are repeated using polyvinylidene chloride instead of the polyvinyl chloride. Similar results are obtained.

EXAMPLE XXI

Examples X–XIV are repeated using a vinyl chloride-vinyl acetate copolymer (90–10 weight ratio) with similar stabilization.

EXAMPLE XXII

Example XVI is repeated using 0.5 percent of methyl tin mercaptide instead of the T-31. Similar results are obtained.

EXAMPLE XXIII

Example XVI is repeated using octyl tin mercaptide as the tin stabilizer with similar results.

EXAMPLE XXIV

Example XVI is repeated with p-methyl phenyl tin mercaptide instead of the T-31. Corresponding resin stability is obtained.

When the above examples, specifically Examples X–XXIV inclusive, are repeated using from 0.5–6 percent of a tin stabilizer of the group diethyl tin myristate, dibutyl tin di(pentadecanoate), dibutyl tin stearate, phenyl tin trilaurate, dibutyl tin di(cyclohexane carboxylate) lauryl tin mercaptide, phenyl tin mercaptide, biphenylyl tin mercaptide, camphanyl tin mercaptide, cyclohexyl tin mercaptide and naphthyl tin mercaptide with polychlorofluoroethylenes polychloroprene or copolymers of vinyl chloride or vinylidene chloride with vinyl butyrate, butyl acrylate, allyl acrylate, styrene, vinyl naphthalene or chloroprene, similar results are obtained.

The method of stabilizing chlorine-containing vinyl resins involves incorporating the azo aromatic compounds, with or without other stabilizers, by physical admixture with the resin. Generally, roll mills and Banbury type mixers have been found to be effective. The resin may be compounded with or without plasticizers, depending upon the ultimate use of the polymer. Suitable plasticizers for vinyl resins are dioctyl phthalate, tricresyl phosphate, dibutyl sebacate, polyesters prepared from aliphatic dibasic acids and aliphatic dihydric alcohols suitably modified with monobasic fatty acds.

EXAMPLE XXV

This example illustrates the stabilizing action of the stabilizers of this invention when used with rigid (unplasticized) polyvinyl chloride. Two samples were compounded in accordance with the procedure above except that no plasticizer was employed and the mixture was milled at 350° F. instead of 300° F. In one sample the stabilizer consisted of 3 percent dibutyl tin dilaurate and in the other sample 0.05 percent of dimethyl amino azobenzene and 3 percent of dibutyl tin dilaurate, based on the weight of polyvinyl chloride. Using only dibutyl tin dilaurate, color was observed after only 60 minutes and the resin turned dark after 90 minutes. With the dimethylamino azo benzene present, initial color did not appear until 90 minutes and the sample did not darken until after 165 minutes.

The combined stabilizer composition of this invention can contain between about 5 to 200 parts of tin compound per part of azo-aromatic compound and preferably is employed in a concentration of from 10 to 50 parts per part of azo-aromatic compound. The tin stabilizer is generally employed in a concentration of between about 0.1 and 10 weight percent, based on the weight of the resin and preferably is used in a concentration of between about 0.5 and 5 percent. Generally, the stabilizer is premixed and added to the resin together with any other additive, such as plasticizers, lubricants, pigments and the like.

The stabilized compositions of this invention are useful in the manufacture of moldings, extrusions, sheets, films, coatings, and similar articles. The stabilizing resins are particularly useful in the manufacture of toys, household articles, pipes and structural forms.

We claim:

1. A composition resistant to the discoloring effects of heat comprising a vinyl resin selected from the group consisting of polyvinyl chloride, polyvinylidene chloride and copolymers of vinyl chloride and vinylidene chloride with copolymerizable monomers containing a $CH_2=C<$ group, and, as a stabilizer therefor, from about 0.001 to 10 percent, based upon the weight of said vinyl resin, of a tin compound selected from a group consisting of (1) tin mercaptides having the general formula $(RS)_4Sn$ wherein R is a hydrocarbon radical selected from the group consisting of alkyl, aryl, alkaryl, alkenyl and cycloalkyl, and having from one to 20 carbon atoms, and (2) organotin salts of organic acids having the general formula $$R_xSn(COOR')_{4-x}$$

wherein R is a hydrocarbon radical selected from the group consisting of alkyl, aryl and alkaryl, R' is a hydrocarbon radical selected from the group consisting of alkyl, aryl and cycloalkyl, R and R' having from one to 30 carbon atoms, and $x$ is an integer of from 1–3, inclusive, and as a second stabilizer, an azo-aromatic compound having the general formula ArN=NAr' wherein Ar and Ar' are hydrocarbon aromatic radicals, said azo-aromatic compound being employed in a concentration of one part per 5 to 200 parts of said tin compound.

2. The composition of claim 1 wherein said azo-aromatic compound is employed in a concentration of 0.001 to 1 percent, based upon the weight of said vinyl resin.

3. The composition of claim 1 wherein said tin compound is dibutyltin dilaurate.

4. The composition of claim 1 wherein said tin compound is methyl tin mercaptide.

5. The composition of claim 1 wherein said tin compound is employed in a concentration of between about 0.5 and 5 percent, and said azo-aromatic compound is employed in a concentration to provide about one part of said azo-aromatic compound to from 10 to 50 parts of said tin compound.

References Cited in the file of this patent

UNITED STATES PATENTS

| | | |
|---|---|---|
| 2,707,178 | Wilson | Apr. 26, 1955 |
| 2,719,090 | Morehead | Sept. 27, 1955 |